United States Patent [19]

Kobayashi et al.

[11] Patent Number: 4,818,863
[45] Date of Patent: Apr. 4, 1989

[54] ION SOURCE FOR USE IN A MASS SPECTROMETER

[75] Inventors: Tsutomu Kobayashi; Kiichiro Otsuka; Eiji Kubota; Tatsuji Kobayashi, all of Tokyo, Japan

[73] Assignee: JEOL Ltd., Tokyo, Japan

[21] Appl. No.: 136,141

[22] Filed: Dec. 21, 1987

[30] Foreign Application Priority Data

Dec. 27, 1986 [JP] Japan ................... 61-311811
Jan. 30, 1987 [JP] Japan ................... 62-20184
Sep. 2, 1987 [JP] Japan ................... 62-219323

[51] Int. Cl.$^4$ ............................................. B01D 59/44
[52] U.S. Cl. .................... 250/288; 250/281; 250/423 R
[58] Field of Search .......... 250/281, 282, 288, 288 A, 250/423 R, 423 P

[56] References Cited

U.S. PATENT DOCUMENTS 4,267,457  5/1981  Nakagawa et al. ............ 250/522
4,562,351  12/1985  Atherton et al. .............. 250/288
4,708,782  11/1987  Andresen et al. ............. 204/299 R

FOREIGN PATENT DOCUMENTS 3028116  2/1982  Fed. Rep. of Germany ...... 250/288

OTHER PUBLICATIONS

"Direct Coupling of Micro High-Performance Liquid Chromatography with Fast Atom Bombardment Mass Spectrometry", Journal of Chromatography, 346 (1985) 161-166.
Proceedings of the Seventh International Symposium on Capillary Chromatography, Gifu Grant Hotel, Nagara, Gifu, Japan, May 11-14, 1986, pp. 853-862.

*Primary Examiner*—Bruce C. Anderson
*Attorney, Agent, or Firm*—Webb, Burden, Ziesenheim & Webb

[57] ABSTRACT

An ion source for use in a mass spectrometer comprises a porous member arranged in the ionization chamber and bearing against the inlet tube so as to obstruct the open end of the inlet tube. A particle beam is directed to the effluent which exudes from the surface of the porous member after passing through the porous member. A cover shields a portion of the surface of the porous member from the particle beam so as only the most recently exuded effluent is irradiated. The effluent supplied into the porous member by the inlet tube is allowed to exude from surfaces of the porous member other than the surface bombarded with the particle beam so as to carry away stale effluents.

9 Claims, 4 Drawing Sheets

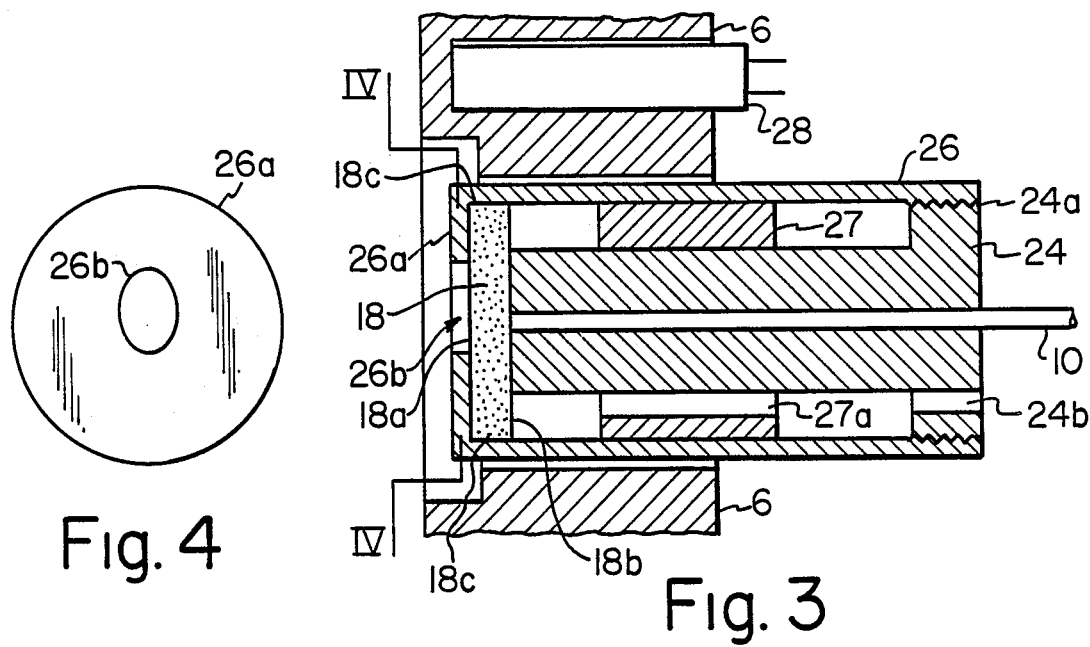
Fig. 4
Fig. 3
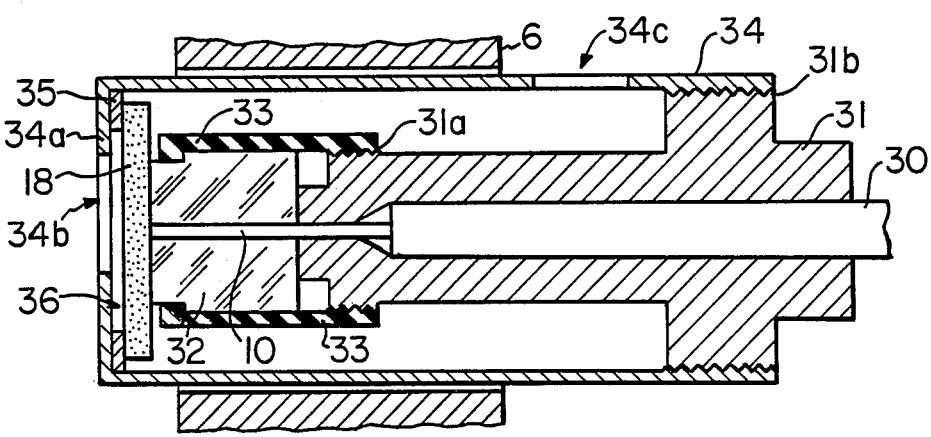
Fig. 6
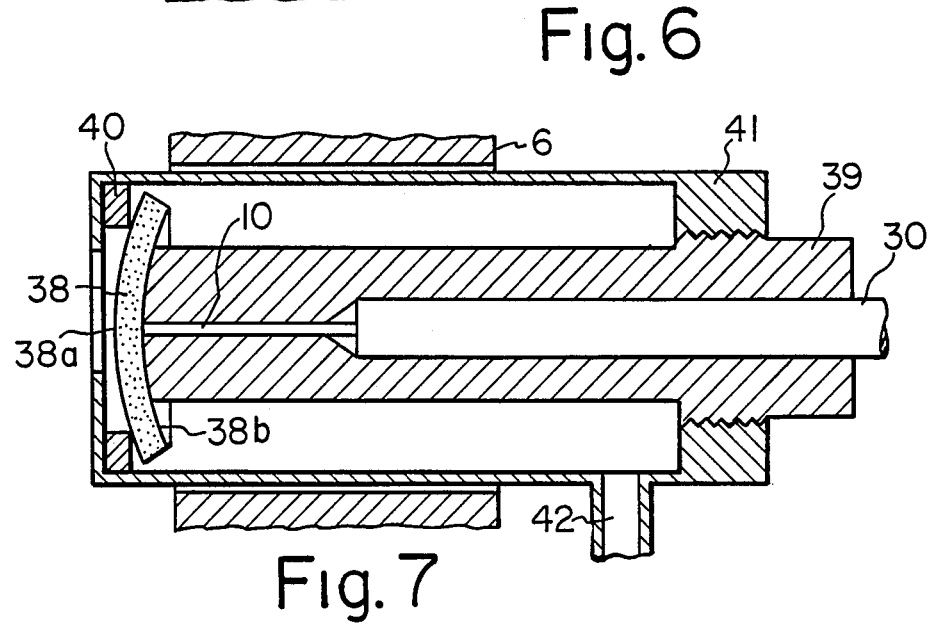
Fig. 7

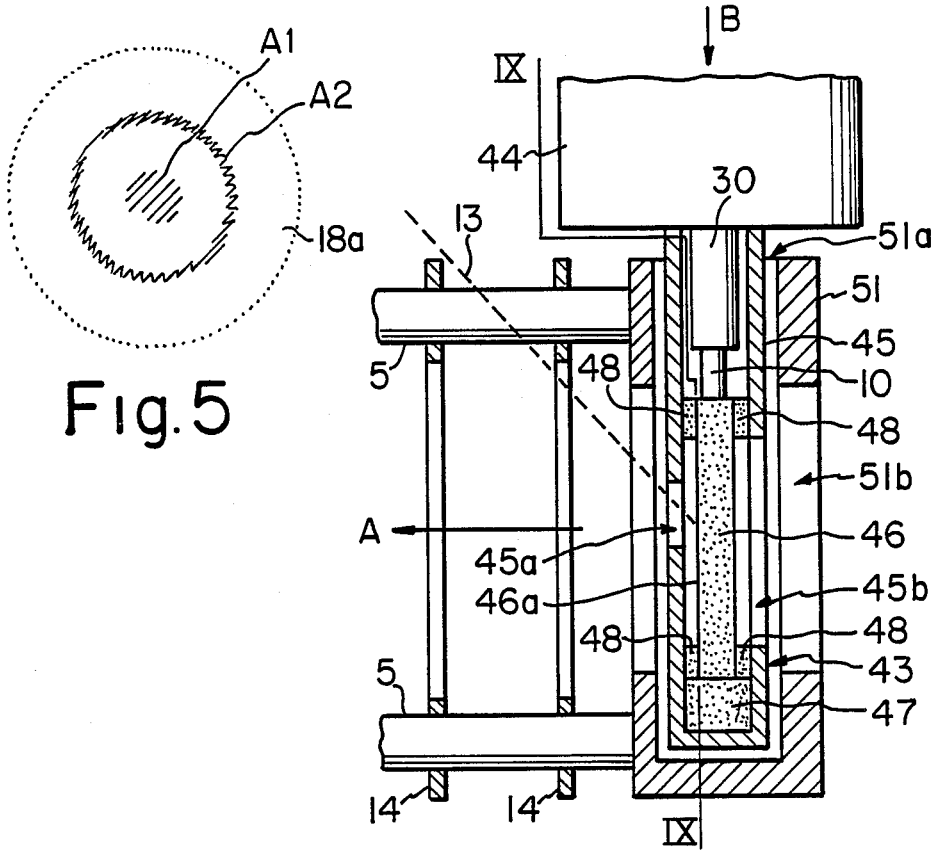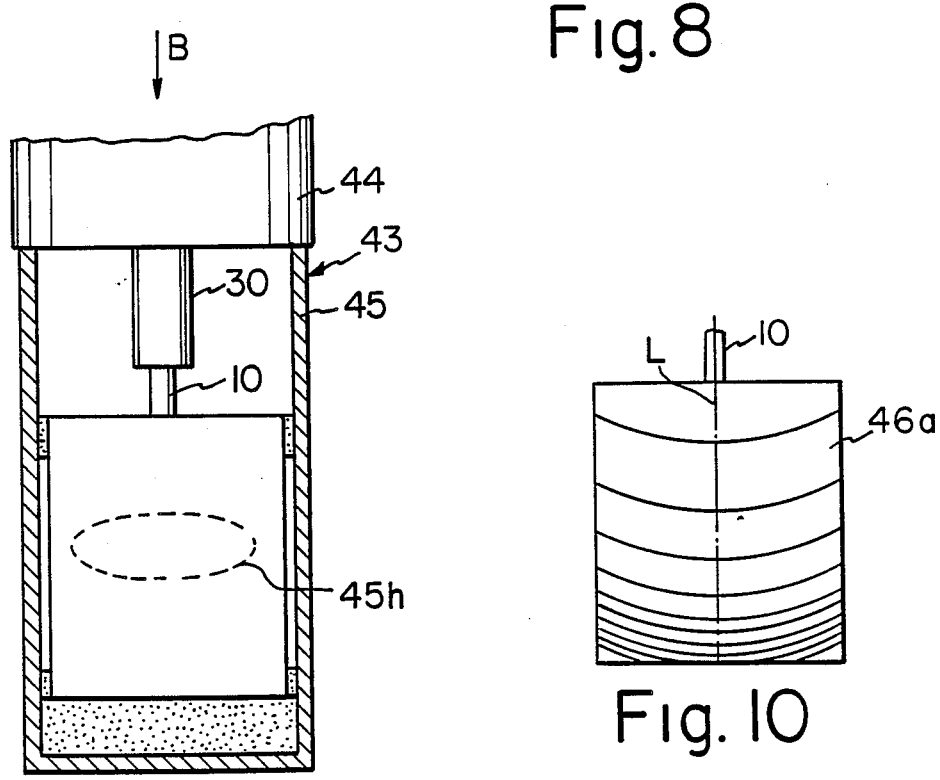

ION SOURCE FOR USE IN A MASS SPECTROMETER

FIELD OF THE INVENTION

The present invention relates to an ion source for use in a mass spectrometer which utilizes FAB (fast atom bombardment, i.e., bombards a sample with a beam of particles, such as neutral particles or ions, for ionizing the sample and, more particularly, to an ion source adapted for use in cases where a mass spectrometer is connected on-line with a liquid chromatograph so that the effluent from the chromatograph may be directly introduced into the ionization chamber, for ionizing the effluent containing the sample.

BACKGROUND OF THE INVENTION

In an LC (liquid chromatography)—MS (mass spectrometry) system, the effluent emerging from a liquid chromatography is directly admitted into a mass spectrometer. In this system, the effluent from the liquid chromatography comprises solvent and mobile phase contained glycerol, which functioned as the matrix. A known ion source for use in this kind of mass spectrometer is shown in FIG. 1.

Referring to FIG. 1, the mass analyzer of the mass spectrometer has a housing 1. Another housing 2 constitutes an ion source. The inside of each housing is connected with several vacuum pumps (not shown) via an exhaust pipe 3 or other pipes (not shown) to maintain it as a high vacuum. A partition wall 4 separates the mass analyzer from the ion source, and is centrally provided with a hole 4a. In the housing 2, four insulating poles 5 surrounding the hole 4a stand on the surface of the partition wall 4, so that a chamber block 6 is fixed to the partition wall 4. The space 7 neighboring the surface of the chamber block 6 is called the ionization chamber. Also, the chamber block 6 itself is often called the ionization chamber. A sample holder 8 is inserted in a hole 6a formed at the center of the chamber block 6 so as to plug up the hole 6a. The holder 8 is mounted at the front end of a cylindrical sample inlet member 9 which extends into the atmosphere through the housing 2 of an ion source. A thin inlet tube 10 extends through the inlet member 9 along its axis. The end of the tube 10 which is in the atmosphere is connected with a micro high-performance liquid chromatograph 11. The other end of the tube 10 that is in the evacuated housing is close to the end surface of the sample holder 8. A particle beam generator 12 for producing a beam of particles, such as neutral particles or ions, is mounted in a hole formed in the upper portion of the housing 2 of an ion source. The beam 13 produced by the generator 12 bombards (irradiates) effluent which exudes from the end surface of the sample holder 8. As a result, the effluent is ionized. The produced ions are extracted in the direction indicated by the arrow A by the action of an electric field set up by the sample holder 8 and converging and accelerating electrodes 14 supported by the insulating poles 5. Some of the ring-shaped electrodes 14 are notched for not blocking the path of the beam 13. The holder 8 is maintained at a given electric potential. Then, the ions are analyzed according to their mass-to-charge ratio in the mass analyzer.

FIG. 2 is a cross-sectional view of the prior art structure of the sample holder 8 shown in FIG. 1. As an example, the inlet tube 10 which introduces effluent from the side of the atmosphere is made of fused silica. A tube 16 made of stainless steel is mounted around the inlet tube 10. A glass tube 17 is mounted around the tube 16. A porous member 18 obstructs the opening of the inlet tube 10. As an example, the porous member consists of a filter made of frit that is fabricated by sintering powdered stainless steel. The porous member 18 is shaped into a disk, and has a thickness of 0.2 mm and a diameter of about 1 mm. The porous member 18 is bonded to the glass tube 17 via adhesive 19 which is applied not only to the contact surface of the porous member 18 with the glass tube 17 but to the side surface of the porous member 18 as shown to prevent effluent from leaking (exuding) off through the side surface of the porous member 18. A repeller power supply 20 applies an appropriate voltage to the porous member 18 via the stainless steel tube 16 to set up an electric field within the ionization chamber 7, for converging the ions emanating from the surface of the porous member 18 and accelerating them in the direction indicated by the arrow A (FIG. 1).

In the conventional structure constructed as described above, the effluent emerging from the liquid chromatograph 11 is admitted into the ionization chamber 7 via the inlet tube 10. The effluent passes through the porous member 18 at the front end of the inlet tube 10 and exudes from the surface of the porous member 18. Then, the effluent is bombarded with a particle beam 13 produced by the particle beam generator 12. The resulting ions are introduced into the mass analyzer 1 where they are analyzed. This conventional instrument is disclosed in the *Journal of Chromatography*, 346 (1985) 161–166, Elsevier Science Publishers B.V., Amsterdam.

In the above-described conventional instrument, the effluent from the liquid chromatograph is directly admitted into the ion source and forced through the porous member to ionize the effluent. In this case, it is required that all the effluent transported be ionized and that previously conveyed sample components do not linger. In order to fulfill these requirements, the flow rate of the effluent into the ion source, the amount of effluent consumed per unit time in the ion source must be balanced. The amount of effluent consumed per unit time in the ion source is determined by the amount of evaporation of the effluent, especially the solvent accounting for a large proportion of it, in a vacuum per unit time, and the amount of ionization and sputtering of the effluent per unit time due to bombardment of the particle beam. Considering the capability of the existing ion source, the adequate flow rate is less than 1 $\mu$l/min. However, the flow rate of the effluent from the micro high-performance liquid chromatograph is as much as about 1 ml/min. to 100 $\mu$l/min. Therefore, an appropriate splitter must be used to reduce the flow rate approximately by two or three orders of magnitude.

However, it is quite difficult for the existing splitter to achieve such small amounts of flow rate. Therefore, it is inevitable that the flow rate is so large as to unbalance the aforementioned factors. This permits unionized effluent to build up on the surface of the porous member 18 under the influence of gravity as indicated by numeral 21. This buildup 21 is also bombarded with the beam 13 and ionized. Therefore, sample components which are separated one after another by high-performance liquid chromatograph gather at the buildup 21 and are ionized simultaneously and analyzed in the mass analyzer. This phenomenon, known as memory effect, yields undesirable results.

SUMMARY OF THE INVENTION

It is a main object of the present invention to provide an ion source which is capable of ionizing only the column effluent introduced most newly even if the flow rate of the effluent introduced into the source exceeds the rate of consumption of effluent inside the source.

The above object is achieved by an ion source having a structure for holding a porous member so that effluent supplied into the porous member is allowed to exude from plural surfaces of the porous member and for covering a portion of the surface of the porous member from the particle beam bombardment.

In one embodiment of the invention, an ion source for use in a mass spectrometer comprises: an ionization chamber formed inside of the housing of the ion source; an inlet tube for introducing effluent into the ionization chamber from outside of the housing that is in the atmosphere; a porous member mounted in the ionization chamber and bearing against the inlet tube so as to plug up the open end of the inlet tube; and a particle beam-emitting means for directing a particle beam to effluent which exudes from the surface of the porous member after passing through the porous member, for ionizing the exuding effluent. The porous member takes the form of a sheet or plate. The ion source is characterized by the provision of a cover member for shielding a portion of the surface of the porous member from the particle beam, and in that the effluent supplied into the porous member by the inlet tube is allowed to exude also from surfaces of the porous member other than the, surface bombarded with the particle beam.

BRIEF DESCRIPTION OF THE DRAWINGS

FIG. 3 is a schematic cross section of main portions of an ion source according to the invention;

FIG. 4 is a schematic cross section of the ion source shown in FIG. 3, taken along a line IV—IV shown on FIG. 3;

FIG. 5 is a schematic representation for illustrating the operation or the ion source shown in FIG. 3;

FIGS. 6, 7, and 8 are schematic cross sections of other ion sources according to the invention;

FIG. 9 is a schematic cross section of the ion source taken along line IX—IX shown in FIG. 8;

FIGS. 10-14 are diagrams for illustrating the operation of the ion source shown in FIG. 8.

DESCRIPTION OF THE PREFERRED EMBODIMENTS

Figure 1:
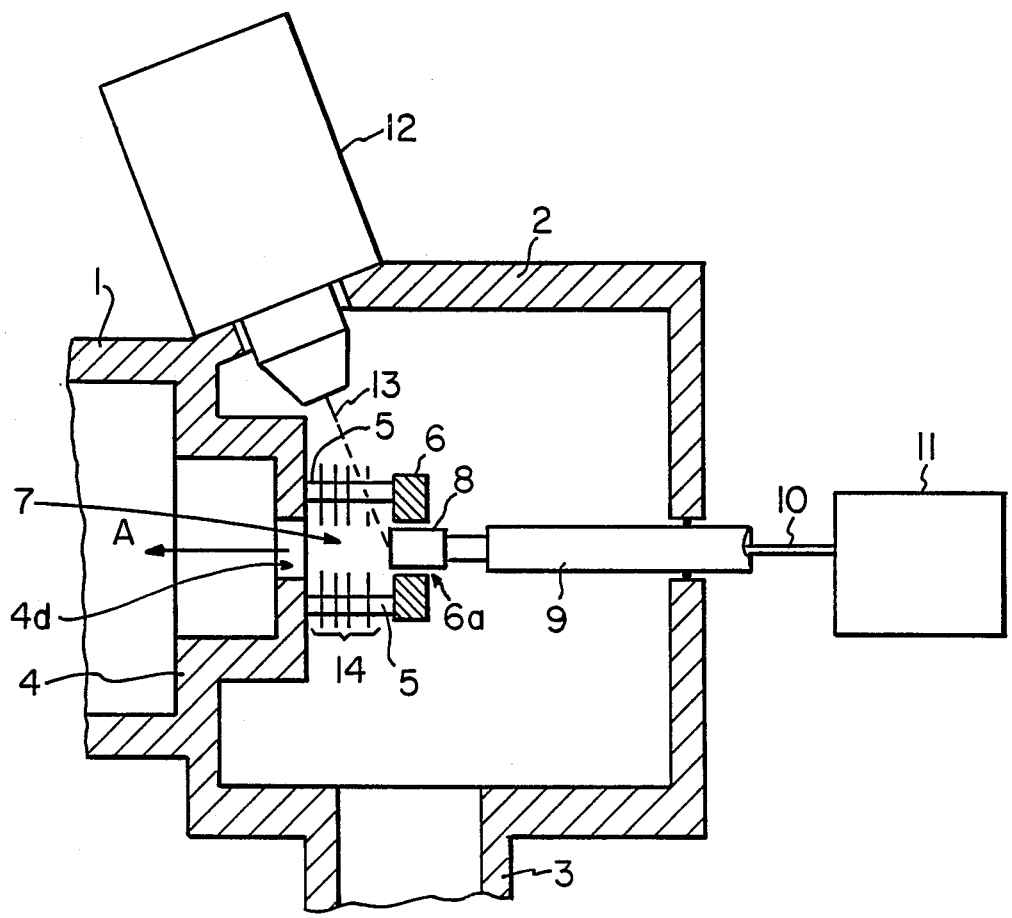
FIG. 1 is a schematic cross section of a mass spectrometer ion source connected with a liquid chromatograph.
Figure 2:
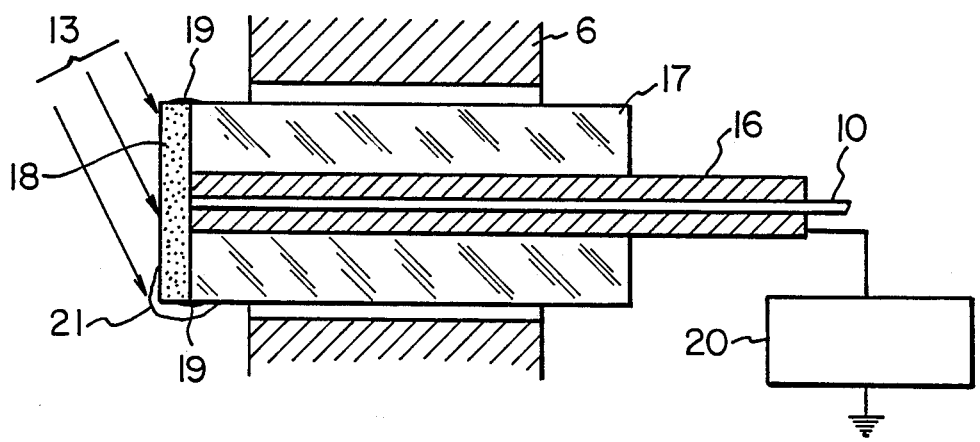
FIG. 2 is a schematic cross section of the prior art sample holder, used in the ion source shown in FIG. 1.

Referring to FIG. 3, an ion source embodying the concept of the invention is schematically shown. It is to be noted that like components are indicated by like reference numerals throughout some figures. The ion source shown in FIG. 3 is similar to the prior art ion source shown in FIG. 2 except for the following points. An outer tube 24 made of stainless steel is used instead of the glass tube 17 of the instrument shown in FIG. 2.

A cylindrical cap 26 having an end 26a is provided with an internal screw thread that engages with an external screw thread 24a formed on the outer periphery of the outer tube 24. The porous member 18 is held between the end 26a of the cap 26 and the end surface of the outer tube 24, so that the porous member 18 plugs up the open end of the inlet pipe 10.

FIG. 4 is a view of the sample holder shown in FIG. 3, taken in the direction in which the ion beam is extracted. The surface of the bottom portion 26a of the cap 26 is shown in this figure. The end portion 26a is provided with a hole 26b to allow the particle beam 13 to pass through it. The hole 26b is shaped as shown to limit the surface of the porous member 18 bombarded with the beam 13 to its central circular region, the beam 13 bombarding on the surface from above obliquely. A cylindrical absorbing member 27 is installed in the gap space between the cap 26 and the outer tube 24. The absorbing member 27 is made of a porous ceramic glass wool, frit of stainless steel, or other material that absorbs liquid. The evaporation gases from the effluent near the porous member are exhausted via exhaust slits 27a and 24b formed in the absorbing member 27 and the outer tube 24.

The chamber block 6, in which the sample holder is inserted, is provided with a recess in which a heat generator 28 is fitted. The generator 28 is shaped like a rod, and consists of a coil of Nichrome wire encased in ceramic. When energized, the generator 28 produces heat that is transmitted to the porous member 18 and the absorbing member 27 via the cap 26.

In the ion source shown in FIG. 3, column effluent introduced into the porous member 18 via the inlet tube 10 exudes various surfaces 18a, 18b and 18c of the member. This prevents effluent introduced through the inlet tube 10 from accumulating excessively on the bombarded region 18a even if the flow rate of the effluent exceeds an acceptable level.

The effluent appearing on the surfaces which are not bombarded with the beam 13 accumulates inside the cap 26. The effluent in the cap is then gradually absorbed by the absorbing member 27. It is not always necessary to install an absorbing member 27 in the cap 26. However, when the effluent in the cap evaporates in it and diffuses into the ion source, there arises the possibility that liquid effluent is violently changed into gas, producing a large amount of gas because of bumping or other effect if no absorbing member 27 is provided. Then, the pressure inside the ion source will change rapidly, adversely affecting the analysis. On the other hand, if the absorbing member 27 is provided, effluent absorbed in the absorbing material evaporates. In this case, the surface area of evaporation is large and so the liquid evaporates constantly without causing bumping. Hence, the fluctuations in the pressure inside the ion source can be reduced. Where it is necessary to promote evaporation inside the absorbing member 27 and to prevent effluent from accumulating inside the absorbing member 27, good results can be obtained by energizing the heat generator 28 to heat the inside of the cap 26.

Heating the porous member 18 smoothens the flow of effluent inside the porous member 18 and accelerates the evaporation of the solvent component from the bombarded region 18a. This, in turn, hastens the condensation of the sample components. Instead of the heat generator 28, a dedicated heating means may be mounted at the front end of the cap. The porous member 18 should be heated to such an extent that the heat lost by evaporation of the solvent component is made up and that the surface bombarded with the beam 13 is retained at room temperature.

FIG. 5 schematically shows the surface 18a of the porous member 18. Referring to FIG. 5, the column effluent introduced into the ionization chamber via the inlet tube 10 is forced into the porous member 18 and passes through it. Then, most of the effluent reaches the center of the surface 18a that is bombarded with the particle beam 13. A great deal of solvent occupying a large percentage of the effluent evaporates while passing through the porous member 18. Therefore, the effluent reaching the surface 18a is enriched with sample components. Therefore, if an effluent is injected into the porous member 18, the effluent migrating straight arrives at the central region A1 of the surface 18a in the short time and appears on the surface. Then, an effluent spreads towards the periphery of the surface 18a after the elapse of a certain period, and appears on an annular region A2. In this way, the column effluent reaching the center of the surface 18a regularly and radially diffuses towards the periphery of the surface 18a. In this way, it is prevented that plural column effluents are accumulated at the center of the surface 18a. Also, the aforementioned memory effect is suppressed.

Referring to the ion source shown in FIG. 3, the bottom portion 26a of the cap 26 allows only the limited central circular region A1 (as shown in FIG. 5) to be bombarded with the particle beam. This prevents the occurrence of the aforementioned memory effect.

FIG. 6 shows main portions of a further ion source according to the invention. In this ion source, the inlet tube 10 is reinforced with a cover pipe 30 and an outer tube 31 made of stainless steel. The pipe 30 is made of Teflon or other similar material. The outer tube 31 is mounted outside the pipe 30. The outer surface of the front end of the inlet tube 10 is rigidly fixed to the outer tube 31 by a rubber member 32 and a cylindrical fixing member 33. The outer tube 31 has an external screw thread 31a on the outer periphery of the front end portion of the tube. The external screw thread is screwed into an internal screw thread formed inside of the fixing member 33. A cylindrical cap 34 having a bottom is provided with an internal screw thread that engages with an external screw thread 31b formed on the outer periphery of the outer tube 31. An annular spacer 35 and the porous member 18 are sandwiched between the end portion 34a and the rubber member 32. A hole 34c is formed in the side wall of the cap 34 to exhaust gas produced inside the cap because of evaporation of effluent. The spacer 35 is firmly fixed to the end portion 34a of the cap 34. The inside diameter of the spacer 35 is set larger than that of a hole 34b formed in the bottom portion 34a. The hole 34b allows passage of the bombarding beam. The end portion 34a of the cap, the spacer 35, and the porous member 18 cooperate to form a recess 36. When the amount of effluent admitted to the porous member 18 per unit time is too much larger than that of effluent consumed per unit time in the porous member 18, superfluous effluent built up on the surface 18a of the porous member 18, especially effluent accumulated on the lower portion of the surface 18a, is collected in the recess 36. Hence, the superfluous effluent can be prevented from being bombarded with the particle beam. Preferably, the spacer 35 is formed with a notch or hole (not shown) to permit the effluent collected in the recess 36 to rapidly move to the inner surface of the cap 34.

In the instrument shown in FIG. 6, the porous member 18 can be easily replaced by unscrewing the cap 34 from the outer tube 31. This makes it easy to maintain the instrument.

FIG. 7 schematically shows main portions of a yet other ion source according to the invention. This ion source includes a porous member 38 having a surface 38a that is bombarded with a particle beam. This surface 38a is bent into a convex form. The rear side 38b is in direct contact with the end of an outer tube 39 of stainless steel. Since the bombarded surface 38a is convex, an annular spacer 40 is made thicker than the spacer 35 shown in FIG. 6. Since the surface of the porous member is shaped into a convex form in this way, unionized effluent does not remain in the central portion for a long time as compared with the case where the surface of the porous member is flat, but diffuses rapidly toward the surroundings. Consequently, the occurrence of the aforementioned memory effect can be suppressed. An exhaust pipe 42 is mounted to the side wall of the cap 41, whereas the side wall of the cap 34 has a hole in the instrument shown in FIG. 6. A vacuum pump (not shown) is connected to the cap 41 via the exhaust pipe 42 to evacuate the inside of the cap 41 independent of both the inside of the ionization chamber and the inside of the ion source. As effluent evaporates inside the cap 41, gas tends to collect in it. Therefore, fluctuations in the pressure inside the ionization chamber can be suppressed.

FIG. 8 is a side elevation in cross section of main portions of a yet further ion source according to the invention. FIG. 9 is a front elevation in cross section of the source shown in FIG. 8. This ion source has a sample holder 43 mounted at the front end of a sample inlet member 44. The holder 43 is inserted into the recess 51a of the chamber block 51 from the atmospheric side through the upper wall 2 of the ion source in a vertical direction indicated by the arrow B, the vertical direction being perpendicular to the direction indicated by the arrow A in which ions are extracted. The chamber block 51 is provided with the hole 51b crossing to the recess 51a. A boxlike cap 45 covers the outside of the holder 43. A hole 45a for permitting passage of the particle beam 13 is formed in the front wall of the cap. A hole 45b is formed in the rear wall of the cap 45 to exhaust gas produced inside the cap because of evaporation of effluent through the hole 51b of the chamber block 51. A porous member 46 in the form of a rectangular plate is mounted in the cap. The open end of an inlet tube 10 is pressed against the central portion of the upper end surface of the porous member 46 by a pressing means (not shown). The inlet tube 10 extends into the atmosphere through a cover pipe 30 and the sample inlet member 44. The end of the inlet tube 10 is connected to a liquid chromatograph. Locating member 47 and 48 are made of an absorbing material.

In the instrument constructed as described above, effluent introduced through the inlet tube 10 diffuses downward through the porous member 46 in a parallel to the surface of the porous member. At the same time, the effluent introduced through the inlet tube 10 diffuses downward on the surface of the porous member 46. Then, the effluent from the lower surface of the porous member 46 is absorbed into the locating member 47 and other members. During this process, the solvent component contained in the effluent evaporates, enriching the sample component contained in the effluent.

Figure 11:
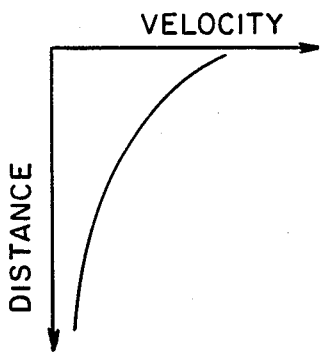
Figure 12:
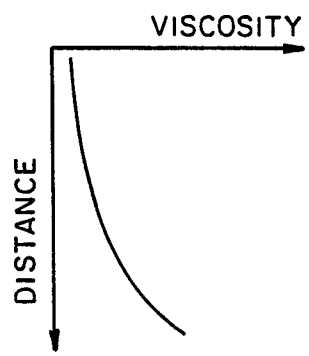

FIG. 10 shows variations in the effluent concentration measured on the surface 46a of the porous member 46 that is bombarded with a particle beam 13 under the condition that effluent is forced through the porous member 46 at a constant flow rate. FIG. 11 shows the velocity of flow measured along a line L on the surface 46a. As can be seen from these two figures, effluent injected into the porous member 46 through the inlet tube 10 diffuses rapidly and becomes enriched rapidly. FIG. 12 shows the viscosity of flow of effluent measured along the line L. It can be seen from this graph that as the concentration increases, the viscosity increases and the velocity of flow decreases rapidly.

Figure 13:
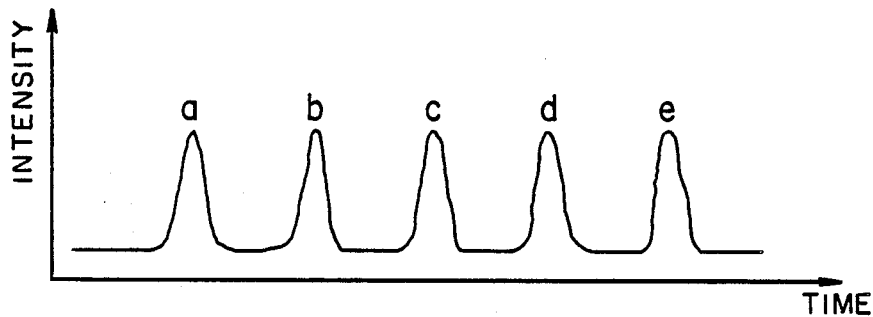
Figure 14:
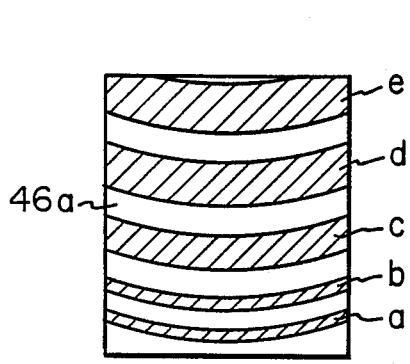

Referring next to FIG. 13, a chromatogram obtained from a liquid chromatograph effluent showed peaks a, b, c, d and e. This effluent was forced through the inlet tube 10. When the sample component corresponding to the peak e reached the upper portion of the surface 46a, the sample components corresponding to the previous peaks a, b, c and d still remained on the lower portion of the surface as shown in FIG. 14. Therefore, if the whole surface 46a is bombarded with the particle beam 13, then the sample components corresponding to these peaks are all ionized simultaneously. This leads to the occurrence of memory effect. In order to avoid this undesirable situation, it is necessary that only a belt-like region on the surface 46a be bombarded with the particle beam 13. At the belt-like region of the center on the surface 46a, the effluent indicated not too low velocity and comparatively high concentration. So, it is preferable to bombard the belt-like region of the center on the surface 46a with particle beam 13. To satisfy this requirement, the hole 45a in the cap 45 shown in FIG. 8 through which the particle beam 13 passes is shaped into a form 45h indicated by the broken line in FIG. 9.

In this way, the instrument shown in FIG. 8 can shape the bombarded region into a belt-like region larger than that of the circular bombarded region of the aforementioned embodiments. Consequently, the ion source shown in FIG. 8 can increase the amount of ionization for the same amount of effluent. This yields various advantages.

In the instrument shown in FIG. 8, effluent is injected into the porous member from above. It is also possible to inject effluent horizontally or from below.

Figure 15:
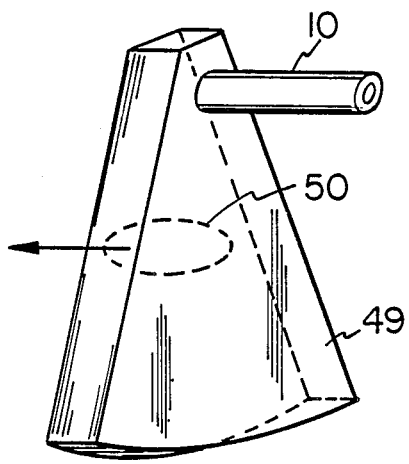
FIG. 15 is a schematic perspective view of main portions of still another ion source according to the invention.

Referring to FIG. 15, a porous member 49 is shaped into a sector. The opening end of an inlet tube 10 is mounted to the rear side of the upper portion of the porous member 49 to inject effluent from the rear side. In this example, a region 50 indicated by the broken line is bombarded with a particle beam 13.

Having thus described our invention with the detail and particularity required by the Patent Laws, what is claimed and desired to be protected by Letters Patent is set forth in the following claims.

What is claimed is:

1. In an ion source for use in a mass spectrometer, the ion source having an ionization chamber formed inside of a housing of the ion source, an inlet tube for introducing effluent into the ionization chamber from outside of the housing, said inlet tube comprising an open end inserted into said ionization chamber, a porous member arranged in the ionization chamber and bearing against the inlet tube so as to obstruct the open end of the inlet tube, and a particle beam generating means for directing a particle beam to effluent which exudes from the surface of the porous member after passing through the porous member, for ionizing the exuding effluent, the porous member taking the form of a sheet or plate wherein said particle beam is directed to a bombarded surface area of said porous member, the improvement comprising
   (a) there is further provided a cover member for shielding a portion of the surface of the porous member from the particle beam, and
   (b) wherein the porous member is configured and supported such that the effluent supplied into the porous member by the inlet tube is allowed to exude from surfaces of the porous member other than the surface bombarded with the particle beam.

2. In an ion source as set forth in claim 1, the further improvement comprising a gap formed between the cover member and the porous member.

3. An ion source as set forth in claim 1, wherein the surface of the porous member comprises a convex sheet or plate.

4. An ion source as set forth in claim 1, wherein the porous member comprises a sheet or plate bearing against the inlet tube so as to obstruct the open end of the tube on the side opposite to the bombarded surface.

5. An ion source as set forth in claim 1, wherein the porous member comprises a sheet or plate bearing against the inlet tube so as to obstruct the open end of the tube at a location remote from the bombarded surface.

6. An ion source as set forth in claim 1, wherein the particle beam generating means generates a beam of neutral particles.

7. An ion source as set forth in claim 1, wherein the particle beam generating means generates a beam of ions.

8. In an ion source for use in a mass spectrometer, the ion source having an ionization chamber formed inside of a housing of the ion source, an inlet tube for introducing effluent into the ionization chamber from the outside of the housing, said inlet tube comprising an open end inserted into said ionization chamber, a porous member arranged in the ionization chamber and bearing against the inlet tube so as to obstruct the open end of the inlet tube, and a particle beam-emitting means for directing a particle beam to the effluent which exudes from the surface of the porous member after passing through the porous member, for ionizing the exuding effluent, the porous member taking the form of a sheet or plate wherein said particle beam is directed to a bombarded surface area of said porous member, the improvement comprising
   (a) there is further provided a cover member for shielding a portion of the surface of the porous member from the particle beam and a means for heating the porous member, and
   (b) wherein the porous member is configured and supported such that the effluent supplied into the porous member by the inlet tube is allowed to exude from the surfaces of the porous member other than the surface bombarded with the particle beam.

9. An ion source for use in a mass spectrometer, comprising:
   an ionization chamber formed inside of the housing of the ion source;
   an inlet means consisting of conduit means for introducing effluent into the ionization chamber from the outside of the housing said conduit means comprising an open end inserted into said ionization chamber;

a porous member arranged in the ionization chamber and bearing against the inlet tube so as to obstruct the open end of the inlet tube, the porous member taking the form of a sheet or plate wherein said particle beam is directed to a bombarded surface area of said porous member;

a particle beam generating means for directing a particle beam to effluent which exudes from the surface of the porous member after passing through the porous member, for ionizing the exuding effluent;

a cover member for shielding a portion of the surface of the porous member from the particle beam;

a cap for receiving either effluent exuding from the surfaces of the porous member that are not bombarded with the particle beam or gas produced by evaporation of the effluent;

an exhaust means which includes a vacuum pump to exhaust gas from the cap via an exhaust pipe; and wherein the porous member is configured and supported such that the effluent supplied into the porous member by the inlet means is allowed to exude also from a surface of the porous member other than the surface bombarded with the particle beam.

* * * * *